Figure 3:
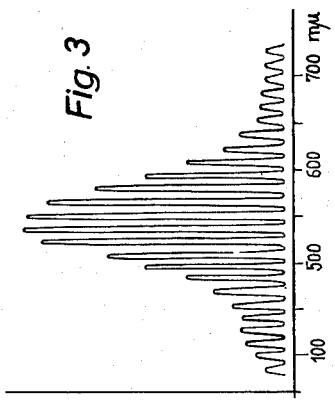

Feb. 14, 1961 E. ROHNER ET AL 2,971,430
AUTOMATIC FILTER SPECTROGRAPH
Filed Dec. 9, 1957 2 Sheets-Sheet 1

ERNST ROHNER
MAX J. O. STRUTT
INVENTORS

By:
Wenderoth, Lind & Ponack
Attys

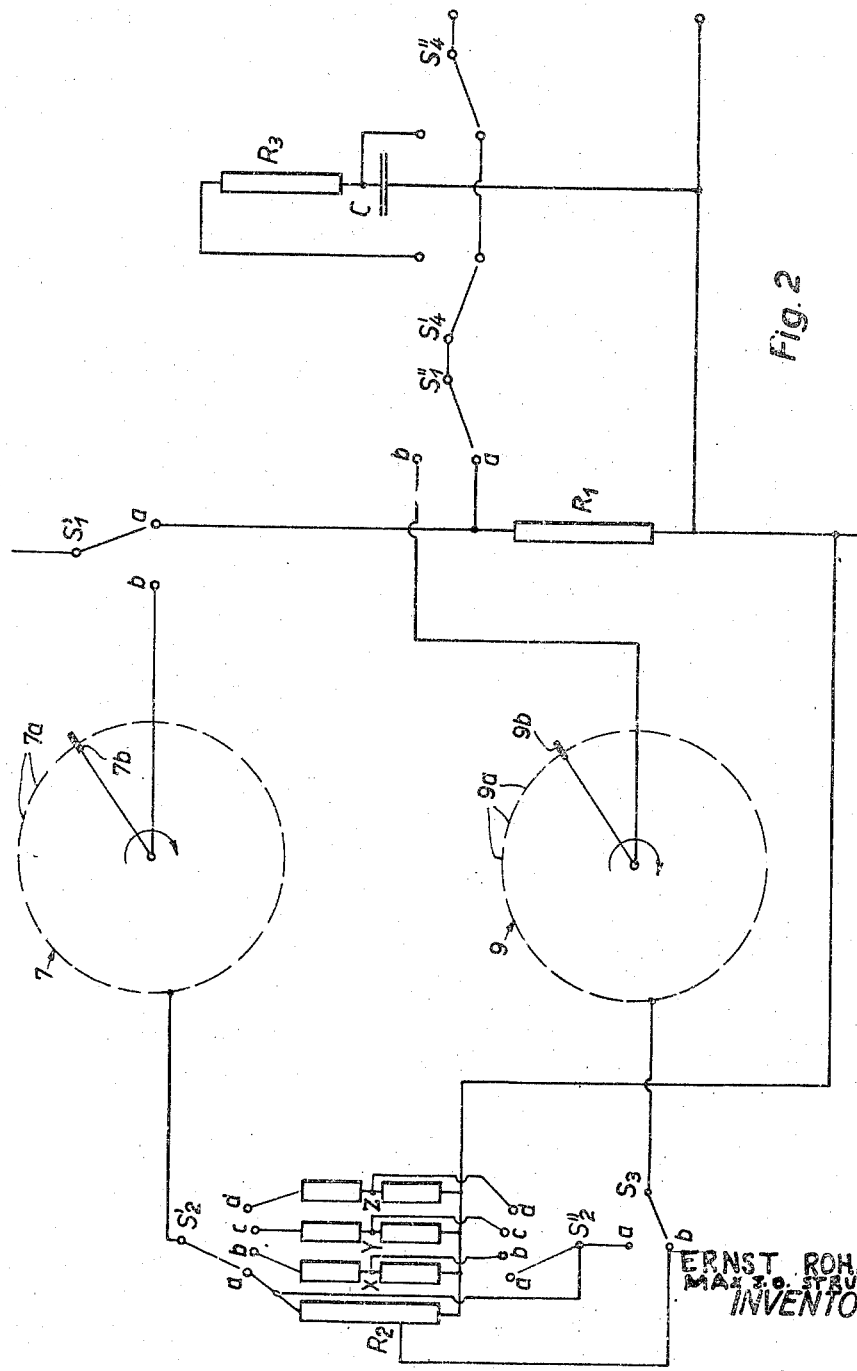

United States Patent Office 2,971,430
Patented Feb. 14, 1961

2,971,430
AUTOMATIC FILTER SPECTROGRAPH

Ernst Rohner and Max J. O. Strutt, Zurich, Switzerland, assignors, by mesne assignments, to Pretema A.G., Zurich, Switzerland Filed Dec. 9, 1957, Ser. No. 701,572

Claims priority, application Switzerland Dec. 12, 1956

4 Claims. (Cl. 88—14)

The present invention relates to a method for automatically indicating the spectrum of objects.

It is an object of the invention to provide a visible indication of the entire spectra of any objects, immediately and without loss of time. Such objects may consist of radiating sources (self-radiation), of reflected radiation, or of media pervious to radiation. The radiation may include wave lengths within and/or without the visible spectrum. A further object of the invention is the provision of an automatic filter spectrograph for carrying out the said method.

It is known to record spectra by means of prism or grating spectrographs.

It is also known that the spectral combination of radiations may be analysed within certain limits by means of filters. It has already been proposed to convert the radiation passing through the filters into electrical quantities which may then be used for actuating a recording device that delivers a curve corresponding to the spectrum of the object. However, all known spectrographs mostly are complicated and mechanically delicate; moreover they do not have very high optical efficiency.

The method according to the invention, in which a plurality of filters is successively moved through the path of rays emanating from the object, whereupon the radiation, which passes the filters, is converted into electrical quantities that will be brought to visible indication, consists in converting the radiation impulses produced by the filters into electrical voltage impulses, by means of which the cathode beam of an electron tube is vertically deflected in such a manner that an image corresponding to these impulses will be produced on the screen of said tube.

The automatic filter spectrograph for carrying out the above method includes a plurality of filters adapted to be successively brought into the path of radiation emanating from the object, a device for converting the radiation passing through the filters into electrical quantities, and an indicating device for a visual representation of these quantities. According to the invention, interference filters for producing radiation impulses are arranged in a closed path of a movable carrier, said radiation converting device comprising a voltage impulse generator responsive to the radiation impulses and controlling with its output the vertical deflection system of a cathode ray tube, of which the horizontal deflection system is controlled by the movement of the filter carrier, in order to produce on the screen of the tube a sequence of impulses corresponding to the passage of the rays through the individual filters.

Figure 1:
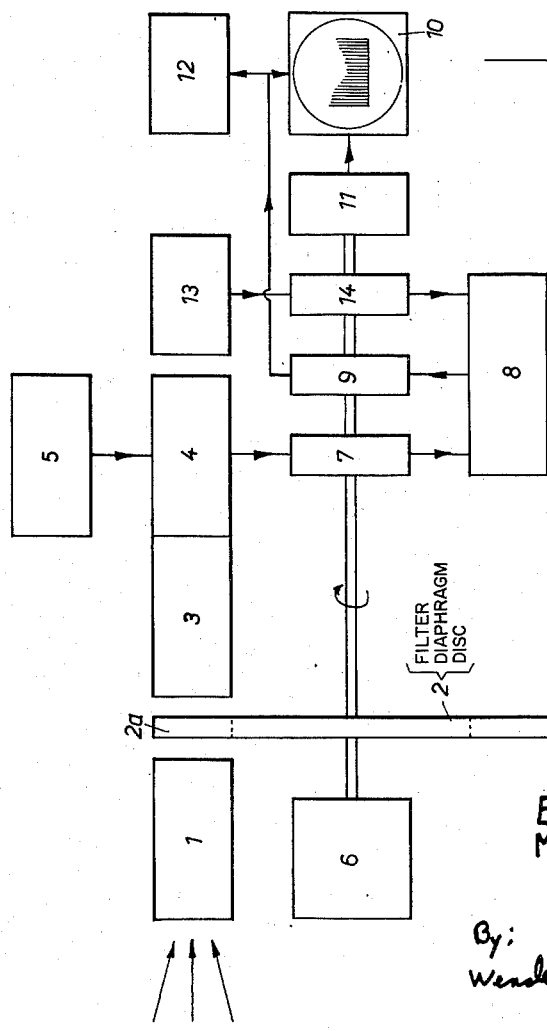

The present invention will now be described more fully with reference to the accompanying drawings illustrating, by way of example, a preferred embodiment of the invention, and in which:

Figure 1 shows diagrammatically the constructional arrangement of the spectrograph, Figure 2 shows the circuit diagram of a portion of the spectrograph according to Figure 1, and Figure 3 represents an example of the image which is obtained on the screen of the cathode ray tube.

The radiation to be analysed passes from the object, not shown, to part 1 (Figure 1) where it is adjusted to a parallel bundle of rays by means of a suitable optical system. The filter elements 2a, mounted on the periphery of a filter wheel 2 driven by a motor 6 are moved into the path of the rays in the desired sequence, while the wheel is rotating. One revolution of the filter wheel corresponds to a single passage of the spectral measuring range, since the transmission ranges of the filters are distributed over the desired spectral range. Interference filters are used, which have half-value widths sufficiently narrow and the spectral transmission curves of which extend practically symmetrically with respect to the centre of gravity of the filter; a filter element 2a comprises an interference filter, a mechanical diaphragm and possibly additional filters. The diaphragm and the additional filters permit a control of the radiant energy transmitted by the interference filter. The mechanical diaphragms associated with the filters serve in this case for the purpose of calibrating the apparatus. The sensitivity of the measuring apparatus may thus be changed for each individual point of the spectral measuring points, as desired, so that for instance the spectral sensitivity of the apparatus will be constant over the entire measuring ranges. The radiation impulses, which are generated by the filter elements upon traversing the radiation path when the filter wheel 2 rotates, are again collimated in part 3 by means of a suitable optical system and directed towards the radiation receiver 4 which converts the radiation impulses into corresponding electrical impulses. The part 5 represents the electrical supply portion of the radiation receiver 4. By means of a switching device 7 which is provided with a number of contacts 7a (Fig. 2) corresponding to the number of filter elements 2a, and which is driven by the common motor 6 in synchronism with the filter wheel 2, a separate load impedance is associated to each current impulse of a sequence of impulses produced by rotation of the filter wheel, said load impedances being combined or assembled in the part 8. This arrangement permits a continual distribution of the voltage impulses occurring across the various load impedances. The spectral sensitivity of the filter spectrograph can thereby be selectively changed in addition to the mechanical correction possibility by means of the filter diaphragms and the optical possibility of correction by means of additional filters. The combination of these three different possibilities of control offers great advantages with respect to the application of the automatic filter spectrograph in the field of testing technique, which advantages will be explained hereinafter by way of example. The divided voltage impulses are fed to the vertical deflecting system of a cathode ray tube 10 by means of a switch 9 which is provided with switch contacts 9a (Fig. 2) and constructed similar to switch 7. The deflecting impulses required for the horizontal deflecting system of the cathode ray tube are produced in the part 11 in such a manner that they are synchronised with the rotation of the filter wheel 2 and thus with the sequence of impulses recorded on the screen of the cathode ray tube 10. This results in an upright image of the sequence of impulses on the screen, corresponding to one revolution of the filter wheel. Fig. 3 represents such an image which had been obtained in testing an incandescent lamp with green glass bulbs. The curve connecting the summits of the impulses corresponds to the desired spectral shape. Since this curve is determined by the sequence of impulses on the screen immediately after the occurrence of radiation in front of the part 1, radiations may also be analysed, the spectral composition of which varies in time. Compensating voltage impulses may be supplied to the various load impedances of the radiation receiver in part 8 by means of the electrical part 13 through the switch 14 constructed similar to the switches 7 and 9. Disturbing spectral line influences, which occur during the analysis of combined spectra (continuous spectrum plus line spectrum) may thereby be eliminated. In place of using the image of the impulse sequence, formed on the screen of the cathode ray tube 10 and corresponding to a spectrum, the individual impulses of the sequence of impulses may also be added up by means of an integration circuit 12. Therefrom results the integral value of a spectrum across the spectral measuring range.

According to Figure 1 the part 1 is designed in such a manner that the following types of radiations may be tested:

(a) Self-radiation sources, (b) Transmitted radiations of pervious media with respect to a basic radiation. The media may be solid, liquid or gaseous, (c) Remitted radiations from reflecting media referred to a basic radiation. The media may be solid, liquid or gaseous.

(d) Combinations between the radiations (a), (b) and (c).

The described spectrograph permits the reception of transmission and reemission spectra with directed and diffused irradiation of the media.

By using a calibrating ray source, the diaphragm apertures of the filter elements can be adjusted so that the curve, connecting all impulse summits of the sequence of impulses appearing on the screen, corresponds to the relative spectral distribution of energy of the calibrating radiation source. Thereby the apparatus is calibrated, i.e. its spectral sensitivity remains constant over the entire spectral measuring range.

The filter spectrograph can be provided with a desired spectral sensitivity by means of a set of suitable additional filters, e.g. gray filters, which are included in the corresponding filter elements. This is for instance the case when transmission and reemission spectra shall be analysed with respect to a prescribed basic radiation. If said basic radiation is not provided, then it may be realised by means of any suitable radiation together with a correspondingly selected spectral sensitivity of the apparatus.

The connection lay-out of switch 7, part 8, switch 9 and part 12 indicated in Figure 1 is illustrated in Figure 2.

When the interconnected switches $S'_1$ and $S''_2$ are placed in position $a$, then the current impulses supplied from the radiation receiver flow through the load resistance $R_1$ and produce across the latter corresponding voltage impulses which are directly fed to the vertical deflection system of the cathode ray tube by way of the position $a$ of the switches $S'_4$ and $S''_4$ which are again interconnected. The sequence of impulses appearing on the screen of said tube corresponds to the real spectral distribution of the radiation to be examined, after the apparatus has been calibrated by means of the mechanical filter diaphragms.

When the switches $S'_1$ and $S''_1$ occupy the position $b$, the current impulses supplied from the radiation receiver pass to the commutator 7 in such a manner that a separate commutator segment 7a is associated with each impulse of the impulse sequence, since the commutator arm 7b is rotated in synchronism with the filter wheel. A separate load of the radiation receiver may thus be imparted to each current impulse. Figure 2 shows only a single load element, the elements pertaining to the remaining current impulses are built in similar manner. When the switches $S'_2$ and $S''_2$, which are mechanically coupled with each other and with all respective switches of the other load elements, occupy the position $a$, then the current impulse produces a corresponding voltage impulse across the resistance $R_2$. Since $R_2$ represents a continuously adjustable potentiometer, any portion may be tapped from this voltage impulse, i.e. the sensitivity of the apparatus may be arbitrarily varied for this measuring point. The obtained partial impulses are fed to the cathode ray tube 10 by way of the commutator 9, the arm 9b of which again rotates synchronously with the filter wheel 2. Appearing on the screen of said tube is a sequence of impulses of which the curve connecting the summits may be brought into any relation to the spectral distribution of the radiation. A practical example will now be given.

Both, the spectral transmission or reflection curve as well as the transmitted or remitted spectrum with respect to a given radiation shall for instance be obtained from a transmitting or from a remitting medium. If the apparatus has been calibrated by means of the mechanical filter diaphragms, the desired transmitted or remitted spectrum immediately appears on the screen, when the switches $S'_1$ and $S''_1$ are placed in position $a$. If the potentiometer $R_2$ and the corresponding potentiometers of the other load elements have been previously adjusted, so as to result on the screen in connection with the given radiation into a series of impulses having constant impulse height, then, as soon as the transmitting or remitting medium has been brought into the path of radiation, the transmission or reflection curve of said medium appears on the screen, when the switches $S'_1$ and $S''_1$ occupy the position $b$ and the switches $S'_1$ and $S''_1$ as well as all corresponding switches are placed in position $a$. The desired spectral curves can be made visible on the screen without loss of time by suitable operation of the switches $S'_1$ and $S''_1$. When a certain basic radiation is required, the present radiation, without changing the mechanical adjustment and the electrical regulation, may be corrected by means of suitable gray filters, which are added to the filter elements, so that the desired distribution appears on the screen.

The possibilities of using the automatic filter spectrograph are much increased, if the apparatus can be originally equipped with certain spectral sensitivities. By means of suitably dimensioned potentiometers which are additionally connected to the potentiometer $R_2$ and to all corresponding potentiometers in the manner shown in Figure 2, such spectral sensitivities may be imparted to the apparatus by a simple operation of the switches $S'_2$ and $S''_2$ and all corresponding switches. In the present case, three different sensitivities (switch positions $b$, $c$, and $d$ of the switches $S'_2$ and $S''_2$ and all corresponding switches) are provided as examples in Figure 2, which correspond to the sensitivity of the human normal eye and to the normal stimultations curves X, Y and Z of the TBK-system. The possibility is thereby provided to carry out with the apparatus according to the invention objective photometric measurements and also colour coordinate measurements for the representation of the colour points in the colour triangle. In this case the switch combination $S'_4$—$S''_4$ is adjusted to position $b$. The impulses are fed to the integration circuit, wherein the voltage produced across the condenser C represents a measure for the integration value of the curve connecting the summits of a sequence of impulses.

The circuit connections contained in part 13 of Figure 1 and which serve for compensating the disturbing influence of spectral lines during the examination of radiations having composed spectra, are composed as follows:

A number of continuously adjustable potentiometers connected are supplied from a voltage source, and said numbers corresponds to the number of filter elements 2a and thus to the number of impulses contained in a sequence of impulses. The voltage tapped from the individual potentiometers are fed to the switch segments of the switch 14 in Figure 1. The arm of the switch is again rotating synchronously with the filter wheel 2 and feeds the various compensating voltages to the different loads of the radiation receiver. Thus the possibility exists to assign a separate compensation voltage to each impulse of the sequence of voltage impulses produced by the radiation receiver across the load elements thereof.

We claim:

1. A filter spectrograph for automatically indicating the spectrum of objects, comprising a collimator for producing a beam of parallel rays from the radiation emanating from an object, a series of interference filters, a movable filter carrier on which said interference filters are mounted, said carrier being mounted for successively moving said filters in a closed path across the said beam of rays for producing radiation impulses, a mechanical diaphragm associated with each filter for adjusting the sensitivity of the individual filters for calibrating purposes, radiation converting means mounted in the path of the impulses after they have passed said mechanical diaphragm and said filters and including a voltage impulse generator responsive to said radiation impulses, a commutating device driven synchronously with the filter carrier and having segments to which said radiation converting means is successively connected, a separate load impedance corresponding to each filter connected to each segment and having a continuously variable tap to provide for continuous electrical variation of the sensibility of the individual filters, a cathode ray tube having a vertical deflection system to which said load impedances are connected for control by the outgoing impulses of said voltage impulse generator and a horizontal deflecting system controlled by the movement of said filter carrier for producing on the screen of said tube a sequence of impulses corresponding to the passage of the rays collimated by said collimator through the individual filters.

2. A filter spectrograph according to claim 1, wherein at least one additional filter is associated with each filter to provide for optical variation of the sensitivity of the individual filters.

3. A filter spectrograph according to claim 1, in which the impedance having a variable tap is associated with an additional impedance having a tap arranged so that spectral sensitivities of the filter spectrograph are obtained which correspond to the sensitivity of the normal human eye and the normal stimulation curves of the TBK-system.

4. A filter spectrograph according to claim 1, wherein electrical means are provided for summarising the voltage impulses produced by the filters, in order to obtain integration values of spectra.

References Cited in the file of this patent

UNITED STATES PATENTS

| | | |
|---|---|---|
| 2,193,606 | Ulrey | Mar. 12, 1940 |
| 2,240,722 | Snow | May 6, 1941 |
| 2,330,877 | Fleisher et al. | Oct. 5, 1943 |
| 2,411,741 | Michaelson | Nov. 26, 1946 |
| 2,413,080 | Seeley | Dec. 24, 1946 |
| 2,420,077 | Hasler et al. | May 6, 1947 |
| 2,437,323 | Heigl et al. | Mar. 9, 1948 |
| 2,517,554 | Frommer | Aug. 8, 1950 |
| 2,679,010 | Luft | May 18, 1954 |
| 2,723,589 | Bullock et al. | Nov. 15, 1955 |
| 2,741,703 | Munday | Apr. 10, 1956 |
| 2,741,941 | Madsen et al. | Apr. 17, 1956 |